United States Patent [19]

Aoki et al.

[11] Patent Number: 5,354,487
[45] Date of Patent: Oct. 11, 1994

[54] SOLID LUBRICANT AND COMPOSITION

[75] Inventors: Nobuo Aoki; Shinichiro Suzuki; Hisatake Sato, all of Yokohama, Japan

[73] Assignee: Nippon Oil Co., Ltd., Japan

[21] Appl. No.: 681,874

[22] Filed: Apr. 5, 1991

[30] Foreign Application Priority Data

Apr. 6, 1990 [JP] Japan ..................... 2-91500
Apr. 6, 1990 [JP] Japan ..................... 2-91501

[51] Int. Cl.⁵ ................ C10M 107/14; C10M 107/38; C08L 5/00
[52] U.S. Cl. .................... 252/58; 252/43; 252/12; 525/235; 525/236
[58] Field of Search ............ 252/58, 43, 12; 525/236, 235

[56] References Cited

U.S. PATENT DOCUMENTS

| | | | |
|---|---|---|---|
| 3,083,175 | 3/1963 | Safford et al. | 260/45.5 |
| 3,445,393 | 5/1969 | Hinds | 252/58 |
| 3,600,309 | 8/1971 | Loser et al. | 252/58 |
| 3,994,815 | 11/1976 | Coleman | 252/52 R |
| 4,252,658 | 2/1981 | Tasaka et al. | 252/29 |
| 4,978,463 | 12/1990 | Satoji | 252/58 |

FOREIGN PATENT DOCUMENTS

| | | |
|---|---|---|
| 0389076 | 9/1990 | European Pat. Off. . |
| 1913278 | 10/1969 | Fed. Rep. of Germany . |
| 2103316 | 4/1972 | France . |
| 1374040 | 11/1974 | United Kingdom . |

OTHER PUBLICATIONS

Hawley's Condensed Chemical Dictionary, 11th edition Van Nostrand Reinhold. N.Y. 1987. pp. 1004, 1018 (month unavail.).

Primary Examiner—Prince Willis, Jr.
Assistant Examiner—James M. Silberman
Attorney, Agent, or Firm—Bruce L. Adams; Van C. Wilks

[57] ABSTRACT

Compositions of high lubrication and light coloration are disclosed in which a selected class of resins and rubbers is blended with a specified cured polybutadiene product. The cured product results from crosslinking more than 10% of vinyl bonds in a butadiene polymer having a vinyl bond content of not less 20% by mol in terms of its monomer unit. Also disclosed are solid lubricants comprising a specified fluorinated cured polybutadiene and compositions containing the solid lubricant.

8 Claims, 2 Drawing Sheets

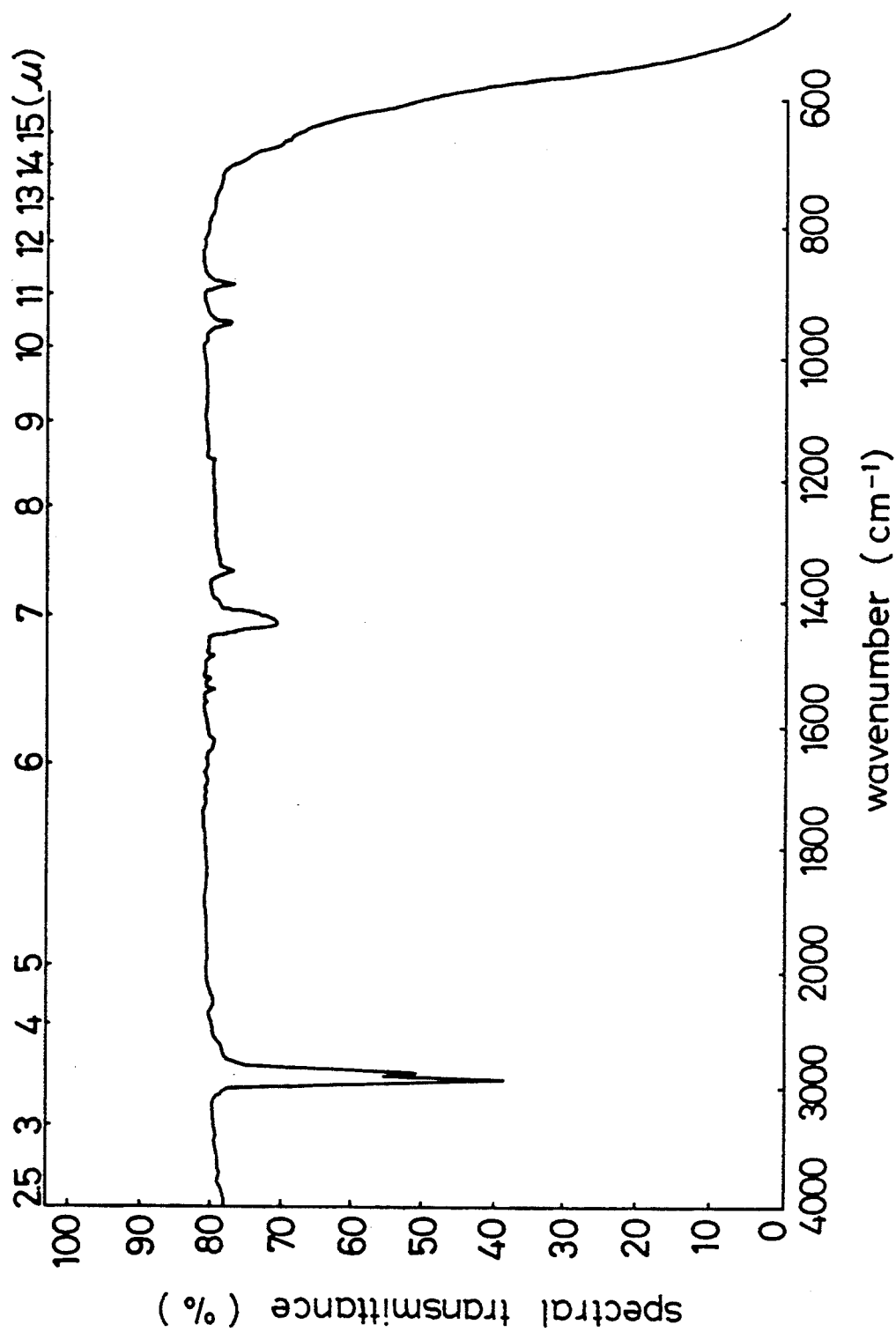

SOLID LUBRICANT AND COMPOSITION

BACKGROUND OF THE INVENTION

1. Field of the Invention

This invention relates to compositions containing a selected base material and a specified cured polybutadiene. The invention further relates to solid lubricants comprising a specified fluorinated cured polybutadiene and to compositions containing such a lubricant.

2. Description of the Prior Art

Great concern has recently been directed toward higher lubrication qualities of resins and rubbers and of oils and greases. To this end a given base material has been blended with a solid lubricant such as molybdenum disulfide, tungsten disulfide or graphite.

Although capable of improving lubrication to some degree, the above lubricant additive is unsatisfactory in areas of industry where such quality is necessary with a higher magnitude. In this instance the additive needs to be added in a relatively large amount and hence only in a costly manner and moreover tends to be less dispersible in a lubricating oil or grease as the base material. Another problem is that the resulting composition is unsightly in appearance due to the additive being blackish in color.

SUMMARY OF THE INVENTION

It has now been found unexpectedly that compositions of enhanced lubrication and reduced coloration can be obtained by blending a selected base material with a cured product derived by crosslinking a polybutadiene of a specified configuration.

The present invention seeks to provide novel compositions which are highly lubricative, fully sightly and greatly economical.

The compositions according to the invention are applicable to machine parts such as shafts, bearings, sealants, rolls and the like.

The invention further turns on the finding that solid lubricants comprising a fluorinated cured polybutadiene of a specified type can give rise to compositions of improved lubrication and appearance characteristics.

The invention therefore seeks to new solid lubricants and compositions containing such a lubricant which exhibit the foregoing features.

The solid lubricant containing compositions of the invention find application not only to machine parts such as shafts, bearings, sealants, rolls and the like but also to lubricating oils such as engine oils, hydraulic fluids, gear oils, bearing oils and the like, and to greases and paints.

As will become better understood from the following description, the invention provides a composition comprising a base material and a cured product resulting from crosslinking more than 10% of vinyl bonds in a butadiene polymer having a vinyl bond content of not less than 20% by mol in terms of its monomeric unit, the butadiene polymer being homopolymeric or copolymeric.

In another aspect the invention provides a solid lubricant comprising a fluorinated cured product resulting from crosslinking more than 10% of vinyl bonds in a butadiene polymer having a vinyl bond content of not less than 20% by mol in terms of its monomeric unit and subsequently from treating with a fluorinating agent.

In a still another aspect the invention provides a composition comprising a base material and a solid lubricant comprising a fluorinated cured product resulting from crosslinking more than 10% of vinyl bonds in a butadiene polymer having a vinyl bond content of not less than 20% by mol in terms of its monomeric unit and subsequently from treating with a fluorinating agent.

BRIEF DESCRIPTION OF THE DRAWINGS

FIGS. 1 and 2 are spectral representations respectively showing the infrared spectrophotometric analysis of the butadiene polymer according to the present invention before and after being cured.

DETAILED DESCRIPTION OF THE INVENTION

Figure 1:
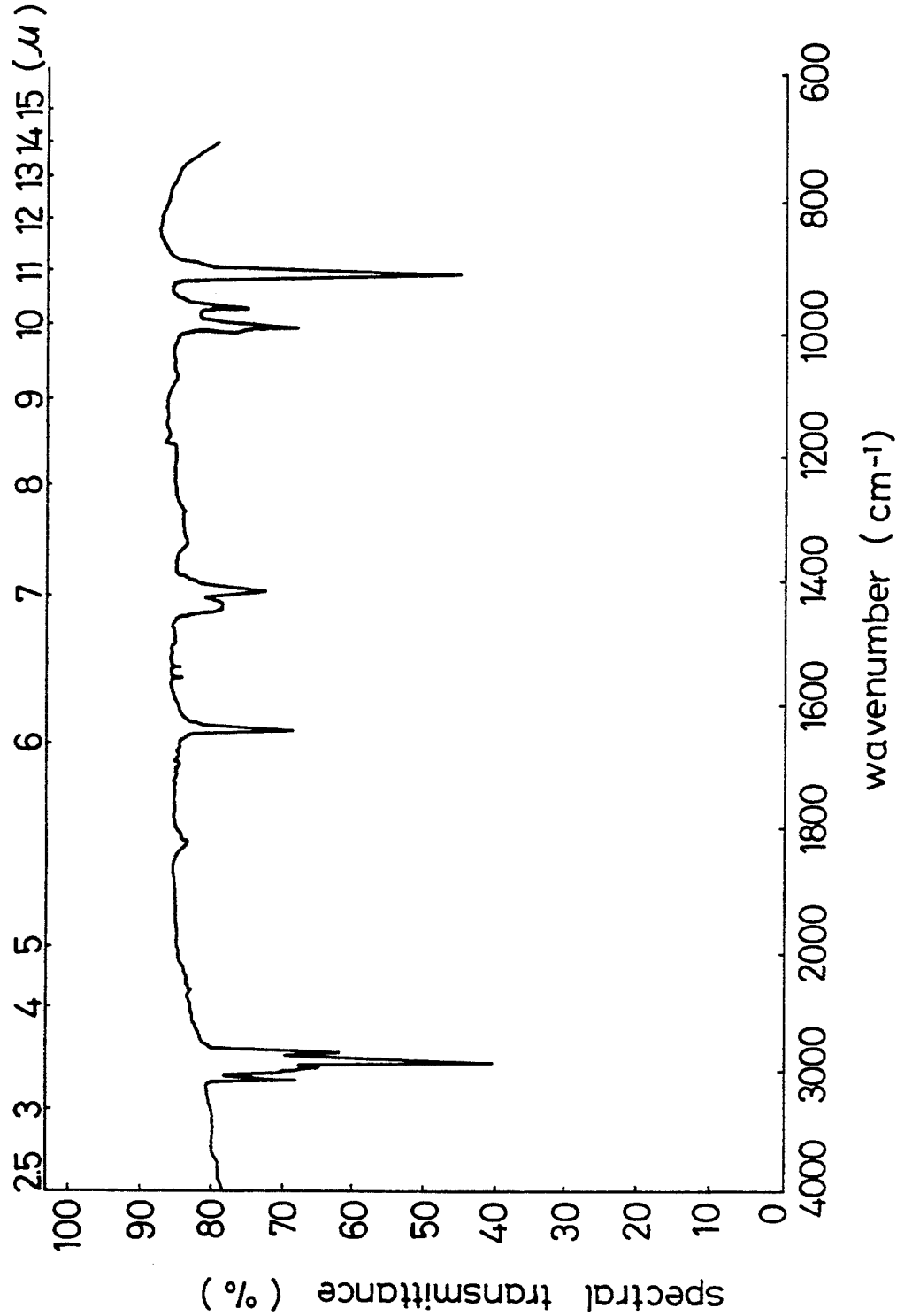

The compositions of the present invention are comprised essentially of a base material and a cured product obtained by crosslinking a specific polybutadiene.

Butadiene polymers contemplated under the invention may be produced by various modes of reaction of butadiene. They include anionic polymerization initiated by sodium dispersants and organoalkali catalysts, radical polymerization by organic peroxides, cationic polymerization by Friedel-Crafts type catalysts and anionic coordination polymerization by Ziegler type catalysts.

Polybutadienes usually have cis and trans bonds in addition to vinyl bonds. The butadiene polymer useful in the invention may be, in vinyl content, not less than 20%, preferably 40% or more, more preferably 50% or greater, most preferably above 70%, each percentage by mol, in terms of the monomeric unit.

Cured products used herein are those derived by crosslinking more than 10% of the vinyl bond content in a given butadiene polymer, preferably greater than 40%, more preferably beyond 70%, most preferably above 90%. The crosslink reactivity of the vinyl bonds according to the invention is determined by infrared spectrophotometry and represented by the following equation.

$$R(\%) = \frac{A - B}{A} \times 100$$

R: crosslink reactivity
A: vinyl bond content before cure
B: vinyl bond content after cure The butadiene polymer according to the invention may range in number-average molecular weight from 500 to 100,000, preferably from 1,000 to 20,000, more preferably from 1,500 to 8,000. The molecular weight if not exceeding 500 would cause prolonged curing, while above 100,000 would lead to too high viscosity and handling inconvenience.

In the practice of the invention, the butadiene polymer may be homopolymeric or copolymeric in nature. As comonomers styrene, α-methylstyrene, acrylonitrile and the like are used of which styrene is particularly preferred. The polymer may also be reformed, if desired, in known manner with use of a suitable acid or peroxide thereby attaching hydroxyl or carboxyl groups to the molecule. Reformed polymers include for example a polybutadiene having introduced maleic anhydride and a polybutadiene having epoxidized carbon-carbon bonds. Even in the case of copolymerization or reforming, however, the vinyl bond content should not depart from the above specified range.

The cured product according to the invention may be obtainable, though not restrictive, in the presence of a radical initiator of an organic peroxide or aromatic hydrocarbon class. The peroxide includes methyl ethyl ketone peroxide, 1,1-bis(t-butylperoxy)-3,3,5-trimethylcyclohexane, t-butylhydro peroxide, dicumyl peroxide, 2,5-dimethyl-2,5-di(t-butylperoxy)hexyne-3 and the like, whereas the hydrocarbon includes 2,3-dimethyl-2,3-diphenylbutane, 2,3-diethyl-2,3-diphenylbutane and the like. Particularly preferred among these initiators are 2,5-dimethyl-2,5-di(t-butylperoxy )hexyne-3, 2,3-diethyl2,3-diphenylbutane and 2,3-dimethyl-2,3-diphenylbutane, and the last-mentioned compound is best chosen.

Cure temperatures of the butadiene polymer according to the invention are dependent upon the decomposition temperature of a given initiator but may be usually in the range of 50° to 350° C., preferably 150° to 330° C., more particularly 240° to 320° C., most preferably 250° to 310° C. Cure durations, though varying with the cure temperatures, may range usually from 10 minutes to 10 hours, preferably from 20 minutes to 3 hours. Partial cure may be done with preheating so that full curing is facilitated.

Prior to curing a different polymer or monomer may if necessary be incorporated in the polybutadiene-initiator system according to the invention. The different polymer is selected from polymethylmethacrylate, polystyrene and the like and the different monomer from trimethylolpropane triacrylate, trimethylolpropane trimethacrylate, pentaerythritol triacrylate, pentaerythritol trimethacrylate, triallyl isocyanurate, triallyl cyanurate and the like. The amount to be used is set smaller than 10 parts by weight in the case of that polymer and below 20 parts by weight in the case of that monomer, each per 100 parts by weight of the polybutadiene.

The cured product according to the invention may be in various forms but is preferably in the form of fine particles with a particle size of less than 100 μm, preferably smaller than 10 μm, more preferably below 1 μm. The particulate product may be prepared by mechanical pulverization or by curing in an emulsified state.

Resins and rubbers are eligible as base materials in the invention.

Resinous base materials used herein are chosen typically from thermoplastic resins such as polyethylene, polypropylene, polybutene, poly-4-methylpentene-1, polystyrene, poly-α-methylstyrene, ABS resin, polyvinyl chloride, polytetrafluoroethylene, polymethyl methacrylate, aliphatic polyamide, aromatic polyamide, polyacetal, polycarbonate, polyethylene terephthalate, polybutylene terephthalate, polyphenylene oxide, polyphenylene sulfide, polysulfone, polyether sulfone, polyether ether ketone, wholly aromatic polyester, polyimide and the like and thermosetting resins such as epoxy resin, unsaturated polyester, phenol resin,melamine resin, polyurethane and the like either alone or in combination. Particularly preferred are polycarbonate, polytetrafluoroethylene, wholly aromatic polyester, polyimide, epoxy resin and phenol resin.

When the composition of the invention is formulated into a resinuous one, the cured product specified above may be added in an amount of 0.01 to 8 parts, preferably 0.1 to 7 parts, more preferably 0.3 to 6 parts, each part by weight, per 100 parts by weight of the resin.

Rubbery base materials according to the invention are natural rubber and synthetic rubbers. Included in synthetic rubbers are styrene-butadiene rubber, butadiene rubber, isoprene rubber, ethylene-propylene rubber, ethylene-propylene -diene rubber, acrylonitrile-butadiene rubber, chloroprene rubber, butyl rubber, urethane rubber, silicone rubber, fluorine rubber and the like among which isoprene rubber, ethylene-propylene rubber and fluorine rubber are particularly preferred. These rubbers, natural and synthetic, may be used alone or in combination.

In the case where a rubber composition of the invention is prepared, the amount of the above specified cured product to be used is not restricted but may conveniently be set at from 0.01 to 60 parts, preferably 0.1 to 40 parts, more preferably 0.3 to 30 parts, most preferably 1 to 20 parts, each part by weight, per 100 parts by weight of the rubber.

The resin and rubber compositions of the invention may be incorporated, where desired, with inorganic fillers for example of a particulate, fibrous or spherical shape. Particulate fillers include metal oxides such as iron oxide, alumina, magnesium oxide and the like, metal oxide hydrates such as aluminum hydroxide, magnesium hydroxide, calcium hydroxide and the like, carbonate salts such as calcium carbonate and the like and silicate salts such as talc, clay and the like. Fibrous fillers are fibers such as of carbon, glass, potassium stannate, ceramics, metal carbide and the like. The filler is added usually up to 200 parts by weight based on 100 parts by weight of each of the resin and rubber compositions.

The resin and rubber compositions of the invention may be molded in the form of profiles and also as films, sheets and various other forms. For instance, film formation may be carried out as by solvent dissolution in conventional fashion. The resin composition finds application to machine parts such as shafts and bearings in particular and the resin composition to rubber parts such as sealants and rolls in particular, all these parts calling for good slidability. Furthermore, the resin composition when used as a paint or ink provides highly lubricative surface finish.

The solid lubricant of the invention is comprised of a fluorinated cured polybutadiene which is derived from fluorination of the cured polybutadiene specified above. The term fluorination denotes a process step of introducing fluorine atoms into the cured product with use of a fluorinating agent, namely a fluoride compound having active fluorine atoms in the molecule.

Fluorinating agents suitable in the invention are hydrogen fluoride, fluorine gas, cobalt trifluoride and the like. Fluorine gas is particularly preferred.

The rate of fluorination according to the invention may be made in the range of 0.1 to 50%, preferably 1 to 40%, more preferably 2 to 30%, most preferably 4 to 25%, in terms of the total weight of fluorine atoms in the resulting modified product. Below 0.1% would be too low in lubrication for the modified cured product to be utilized as a lubricant as produced. Above 50% would suffer from objectionable coloration.

When fluorine gas is employed to treat the cured product according to the invention, the gas may be diluted with an inert gas such as nitrogen, argon or the like. Fluorination temperatures may be, though not restrictive, at from $-100°$ to 150° C., preferably $-60°$ to 120° C., more preferably $-20°$ to 80° C. Lengths of time of treatment are dependent on the gas concentrations and the fluorination temperatures but may be usually from 10 minutes to 20 hours, preferably from 30 minutes to 10 hours.

The fluorinated cured butadiene of the invention may be blended with base materials to provide compositions. It is preferably made particulate as in the polybutadiene cured but not fluorinated and has a similar particle size. In such instance the base materials are lubricating oils, resins and rubbers.

Suitable lubricating oils include those of both mineral and synthetic classes. Mineral oils are atmospheric or vacuum distillates which may be subject to solvent deasphalting, solvent extraction, hydrocarcking, solvent dewaxing, hydrodewaxing, sulfuric acid treatment, clay refining, hydrorefining and the like. Eligible synthetic oils are chosen from normal paraffin, isoparaffin, polybutene, polyisobutylene, α-olefin oligomers such as 1-decene oligomer, alkylbenzenes such as monoalkylbenzene, dialkylbenzene, polyalkylbenzene and the like, polyalkylnaphthalenes such as monoalkylnaphthalene, dialkylnaphthalene, polyalkylnaphthalene and the like, diesters such as di-2-ethylhexyl sabacate, dioctyl adipate, diisodecyl adipate, ditridecyl adipate, ditridecyl glutarate and the like, polyol esters such as trimethylpropane caprylate, trimethylpropane pelargonate, pentaerythritol-2-ethyl hexanoate, pentaerythritol pelargonate and the like, polyglycols such as polyethylene glycol, polyethylene glycol monoether, polypropylene glycol, polypropylen glycol monoether and the like and silicone oils such as polyphenyl ether, tricredyl phosphate and the like. One or more of these lubricating oils, mineral and synthetic, may be used in the invention.

The lubricant composition of the invention may be formulated by the addition of the fluorinated cured polybutadiene within the range of 0.01 to 50 parts, preferably 0.1 to 20 parts, more preferably 0.3 to 10 parts, each part by weight, based on 100 parts by weight of the lubricating oil. Less than 0.1 part would be insufficient in lubrication, and more than 50 parts would show a decline in dispersibility.

Various other additives may be employed in the lubricant composition of the invention. They include antioxideants, cleaning dispersants, viscosity index improvers, pour point depressants, pressure reducers, antiwear agents, extreme pressure additives, oiliness agents, corrosion inhibitors, metal deactivators, rust inhibitors, defoamers, emulsifiers, demulsifiers, disinfectants, colorants and the like. Gelling agents may also be used to convert the lubricant composition to a grease. Details of the above listed additives will need no further explanation as they appear for instance in J. Soc. Lubricants, Japan, Vol. 15, No. 6 and "Additives for Petroleum Products:, T. Sakurai, Saiwai Publishers.

The lubricant composition of the invention is suitable for use as lubricating oils such as engine oils, hydraulic fluids, gear oils and bearing oils in particular and also as greases.

The fluorinated cured polybutadiene according to the invention may be admixed with one or more resins and one or more rubbers respectively specified above, whereby resin and rubber compositions are prepared. In either case such specified polybutadiene may be used in an amount of 0.01 to 60 parts, preferably 0.1 to 40 parts, more preferably 0.3 to 30 parts, most preferably 1 to 20 parts, each part by weight, per 100 parts by weight of each of the resin and rubber. It is to be noted that other details as regards fillers, moldings and applications are rendered identical to those described in connection with the first-mentioned compositions in which the cured polybutadiene not fluorinated is used.

The following examples are given to further illustrate the invention. They should be regarded as illustrative but not as restrictive.

Preparation of Cured Product 100 parts by weight of a polybutadiene of 3,000 in number-average molecular weight, 65% by mol in vinyl bond content and 500 cp in viscosity (Polybutadiene B-3000, Nippon Petrochemicals Co.) were incorporated with 1.0 part by weight of 2,3-dimethyl-2,3-diphenylbutane, followed by heating with stirring at 80° C. The resultant admixture was coated uniformly over an NaCl plate with use of a spinner and sandwiched by another NaCl plate. This curable sample was analyzed by an infrared spectrophotometer (CIP-420, Shimadzu Seisakusho Co.) with the results shown in FIG. 1. The sample was cured for 2 hours in a vessel purged with nitrogen and controlled at 290° C. and analyzed likewise with the results shown in FIG. 2 in which a vinyl bond absorption is taken at 910 $cm^{-1}$. The crosslink reactivity was determined to be 90.4% by Lambert-Beer's law with a reference absorption at 2,900 $cm^{-1}$.

The above curable admixture was then placed in a brass mold and heated in a constant-temperature chamber at 290° C. for 2 hours. The resultant product was grouped by a shock-type ultrafine pulverizer to an average particle size of 16 μm and classified by a high-precision pneumatic classifier to obtain an average particle size of 1.4 μm.

Inventive Example 1

10 parts by weight of the cured product prepared above was added to 100 parts by weight of a polycarbonate (Yupilon S-2000, Mitsubishi Gas Chemicals Co.). The admixture was kneaded and press-molded in a mirror-finished mold to give a 3-mm thick, surface-smooth, light-color plate. Kinetic friction coefficient was examined on a Bowden tester with a stainless steel ball of 10/32 inch in diameter, at a load of 1 kg and at a slide speed of 20 mm/sec. The results are Shown in Table 1.

Comparative Example 1

The procedure of Inventive Example 1 was followed except that a particulate polytetrafluoroethylene of 1.3 μm was substituted for the cured product of the invention. The results are tabulated.

Comparative Example 2

The procedure of Inventive Example 1 was followed except for the use of 10 parts by weight of a particulate molybdenum disulfide of 0.3 μm with the results tabulated.

Comparative Example 3

The procedure of Inventive Example 1 was followed except for the omission of any particulate additive with the results tabulated.

TABLE 1

| run | kinetic friction coefficient | appearance |
| --- | --- | --- |
| Inventive Example 1 | 0.27 | pale |
| Comparative Example 1 | 0.37 | pale |
| Comparative Example 1 | 0.31 | blackish |
| Comparative Example 1 | 0.45 | pale |

Inventive Example 2

12 parts by weight of the cured product prepared above was added to 100 parts by weight of isoprene rubber (IR 2200, Japan Synthetic Rubbers Co.). Kneading and molding were done as in Inventive Example 1 to thereby obtain a 2-mm thick, smooth rubber sheet which was then examined for kinetic friction coefficient as in Inventive Example 1. The results are shown in Table 2.

Comparative Example 4

The procedure of Inventive Example 2 was followed except that a particulate polytetrafluoroethylene of 1.3 μm was blended in place of the cured product according to the invention with the results tabulated.

Comparative Example 5

The procedure of Inventive Example 2 was followed for the use of 12 parts by weight of a particulate molybdenum disulfide of 0.3 μm with the results tabulated.

Comparative Example 6

The procedure of Inventive Example 2 was followed except for the omission of any particulate additive with the results tabulated.

TABLE 2

| run | kinetic friction coefficient | appearance |
| --- | --- | --- |
| Inventive Example 2 | 0.48 | pale |
| Comparative Example 4 | 0.59 | pale |
| Comparative Example 5 | 0.52 | blackish |
| Comparative Example 6 | 0.60 or more | pale |

Preparation of Fluorinated Cured Product 50 g of the cured product prepared above was taken into a 4-liter, temperature-constant vessel was charged with a gas of $F_2/Ar = \frac{1}{3}$, v/v, followed by fluorination at 30° C. for one hour. The resulting product had a fluorine atom content of 10.3% by weight and showed a pale redish color.

Inventive Example 3

1.0 part by weight of the fluorinated cured product obtained above was added to 100 parts by weight of pentaerythritol pelargonate. The admixture was stirred at room temperature to give a pale homogeneous dispersion which was thereafter checked for lubrication performance by a Falex pin block tester at 80° C. and at 250 lb for one hour. Pin wear was 0.5 mg, and seizure load was 2,540 lb.

Comparative Example 7

The procedure of Inventive Example 3 was followed except that a particulate polytetrafluoroethylene of 1.3 μm was added in place of the fluorinated cured product according to the invention. The results are shown in Table 3.

Comparative Example 8

The procedure of Inventive Example 3 was followed except for the use of a particulate molybdenum disulfide of 0.3 μm with the results tabulated.

Comparative Example 9

The procedure of Inventive Example 3 was followed except for the use of the same liquid polybutadiene as employed to prepare the cured product with the results tabulated.

TABLE 3

| run | pin wear (mg) | seizure load (lb) | appearance |
| --- | --- | --- | --- |
| Inventive Example 3 | 0.5 | 2,540 | pale |
| Comparative Example 7 | 36.5 | 860 | pale |
| Comparative Example 8 | 1.5 | 1,410 | backish |
| Comparative Example 9 | 31.6 | 980 | pale |

Inventive Example 4

The procedure of Inventive Example 1 was followed except that the unmodified cured product was replaced by the fluorinated cured product. The results are shown in Table 4.

Comparative Example 10

The procedure of Inventive Example 4 was followed except for the use of a particulate polytetrafluoroethylene of 1.3 μm with the results tabulated.

Comparative Example 11

The procedure of Inventive Example 4 was followed except for the use of a particulate molybdenum disulfide of 0.3 μm with the results tabulated.

Comparative Example 12

The procedure of Inventive Example 4 was followed except for the omission of any particulate additive with the results tabulated.

TABLE 4

| run | kinetic friction coefficient | appearance |
| --- | --- | --- |
| Inventive Example 4 | 0.21 | pale |
| Comparative Example 10 | 0.37 | pale |
| Comparative Example 11 | 0.31 | blackish |
| Comparative Example 12 | 0.45 | pale |

Inventive Example 5

The procedure of Inventive Example 2 was followed except that 12 parts by weight of the modified cured product was used in place of the unmodified cured product. The results are shown in Table 5.

Comparative Example 13

The procedure of Inventive Example 5 was followed except for the use of a particulate polytetrafluoroethylene of 0.3 μm with the results tabulated.

Comparative Example 14

The procedure of Inventive Example 5 was followed except for the addition of a particulate molybdenum disulfide of 0.3 μm with the results tabulated.

Comparative Example 15

The procedure of Inventive Example 5 was followed except for the omission of any particulate additive with results tabulated.

TABLE 5

| run | kinetic friction coefficient | appearance |
| --- | --- | --- |
| Inventive Example 5 | 0.39 | pale |
| Comparative Example 13 | 0.56 | pale |
| Comparative Example 14 | 0.52 | blackish |
| Comparative Example 15 | 0.45 or more | pale |

As is evident from the test data, the resin, rubber and oil compositions of the invention are unexpectedly conspicuously superior in lubrication and light in coloration.

What is claimed is:

1. A solid lubricant comprising a fluorinated cured product resulting from crosslinking more than 10% of vinyl bonds in a butadiene polymer having a vinyl bond content of not less than 20% by mol in terms of its monomeric unit and subsequently from treating with a fluorinating agent, said butadiene polymer having a number-average molecular weight from 500 to 100,000 and said fluorinated cured product being fluorinated to have a fluorine atom content in the range of 0.1 to 50% by weight.

2. A solid lubricant of claim 1 wherein said butadiene polymer is a copolymer of butadiene with styrene, α-methylstyrene or acrylonitrile.

3. A solid lubricant of claim 1 wherein said fluorinated cured product is particulate.

4. A solid lubricant of claim 1 wherein said fluorinating agent is hydrogen fluoride, fluorine gas or cobalt trifluoride.

5. A composition comprising a lubricating oil, a synthetic resin or a rubber and a solid lubricant comprising a fluorinated cured product resulting from crosslinking more than 10% of vinyl bonds in a butadiene polymer having a number-average molecular weight from 500 to 100,000 and a vinyl bond content of not less than 20% by mol in terms of its monomeric unit and subsequently from treating with a fluorinating agent, said fluorinated cured product being present in the range of 0.01 to 50 parts by weight of said lubricating oil, in the range of 0.01 to 60 parts by weight per 100 parts by weight of said synthetic resin, or in the range of 0.01 to 60 parts by weight per 100 parts by weight of said rubber.

6. A composition of claim 5 wherein said lubricating oil is mineral oil, normal paraffin, isoparaffin, polybutene, polyisobutylene, 1-decene oligomer, monoalkylbenzene, dialkylbenzene, polyalkylbenzene, monoalkylnaphthalene, dialkylnaphthalene, polyalkylnaphthalene, di-2-ethylhexyl sebacate, dioctyl adipate, diisodecyl adipate, ditridecyl adipate, ditridecyl glutarate, trimethylpropane caprylate, trimethylpropane pelargonate, pentaerythritol-2-ethyl hexanoate, pentaerythritol pelargonate, polyethylene glycol, polyethylene glycol monoether, polypropylene glycol, polypropylene glycol monoether, polyphenylene ether or tricresyl phosphate or a combination thereof.

7. A composition of claim 5 wherein said resin is polyethylene, polypropylene, polybutene, poly-4-methylpentene-1, polystyrene, poly-α-methylstyrene, ABS resin, polyvinyl chloride, polytetrafluoroethylene, polymethyl methacrylate, aliphatic polyamide, aromatic polyamide, polyacetal, polycarbonate, polyethylene terephthalate, polybutylene terephthalate, polyphenylene oxide, polyether sulfone, polyether ether ketone, wholly aromatic polyester, polyimide, epoxy resin, unsaturated polyester, phenol resin, melamine resin or polyurethane or a combination thereof.

8. A composition of claim 5 wherein said rubber is natural rubber, styrene-butadiene rubber, butadiene rubber, isoprene rubber, ethylene-propylene rubber, ethylene-propylene-diene rubber, acrylonitrile-butadiene rubber, chloroprene rubber, butyl rubber, urethane rubber, silicone rubber or fluorine rubber or a combination thereof.

* * * * *